US010203194B2

(12) United States Patent
Gauje

(10) Patent No.: US 10,203,194 B2
(45) Date of Patent: Feb. 12, 2019

(54) METHOD AND DEVICE FOR MEASURING THE THICKNESS OF A COATING LAYER ON A RUNNING STRIP

(75) Inventor: Pierre Gauje, Klang (FR)

(73) Assignee: ARCELORMITTAL INVESTIGACION Y DESARROLLO, S.L., Sestao, Bizkaia (ES)

( * ) Notice: Subject to any disclaimer, the term of this patent is extended or adjusted under 35 U.S.C. 154(b) by 529 days.

(21) Appl. No.: 13/701,305

(22) PCT Filed: May 30, 2011

(86) PCT No.: PCT/FR2011/051232
§ 371 (c)(1),
(2), (4) Date: Feb. 13, 2013

(87) PCT Pub. No.: WO2011/151585
PCT Pub. Date: Dec. 8, 2011

(65) Prior Publication Data
US 2013/0133575 A1 May 30, 2013

(30) Foreign Application Priority Data

May 31, 2010 (WO) ................. PCT/FR2010/051046

(51) Int. Cl.
G01B 7/06 (2006.01)
G01B 15/02 (2006.01)

(52) U.S. Cl.
CPC ............ *G01B 7/105* (2013.01); *G01B 7/107* (2013.01); *G01B 15/02* (2013.01)

(58) Field of Classification Search
CPC ......... G01B 7/105; G01B 7/107; G01N 27/72
See application file for complete search history.

(56) References Cited

U.S. PATENT DOCUMENTS

| 4,593,244 | A | * | 6/1986 | Summers | ............... G01B 7/105 324/202 |
|---|---|---|---|---|---|
| 4,641,092 | A | | 2/1987 | Sakamoto et al. | |
| 4,752,739 | A | | 6/1988 | Wang | |
| 5,191,286 | A | * | 3/1993 | Fischer | ......................... 324/230 |
| 5,394,085 | A | | 2/1995 | Nix et al. | |
| 5,548,213 | A | * | 8/1996 | Kohmura | ............... G01B 7/107 324/226 |
| 5,800,615 | A | | 9/1998 | Lambert et al. | |
| 6,120,833 | A | * | 9/2000 | Bonnebat et al. | ............. 427/10 |
| 6,366,083 | B1 | | 4/2002 | McClelland | |
| 6,377,039 | B1 | * | 4/2002 | Goldfine | ............. H05K 9/0069 174/377 |
| 7,248,042 | B2 | | 5/2007 | Hachtel et al. | |
| 2002/0079230 | A1 | | 6/2002 | Basol et al. | |
| 2002/0102749 | A1 | * | 8/2002 | Fielden et al. | .................. 438/14 |
| 2003/0067298 | A1 | * | 4/2003 | Nagano et al. | ............... 324/230 |
| 2004/0050323 | A1 | * | 3/2004 | Chae | ......................... C23C 2/20 118/400 |
| 2009/0112509 | A1 | * | 4/2009 | Batzinger et al. | ............ 702/156 |

FOREIGN PATENT DOCUMENTS

| AU | 582340 | 2/1983 |
|---|---|---|
| AU | 582340 B2 | 3/1989 |
| JP | S59-9552 | 1/1984 |
| JP | S61-102504 | 5/1986 |
| JP | S61120961 | 6/1986 |
| JP | H0732510 U | 6/1995 |
| JP | 2000-227422 | 8/2000 |
| JP | 2001-318080 | 11/2001 |
| JP | 2003097904 A | 4/2003 |
| JP | 2003106805 A | 4/2003 |
| JP | 2004518817 A | 6/2004 |
| JP | 2004334977 A | 11/2004 |
| JP | 2005221282 A | 8/2005 |
| JP | 2005281799 A | 10/2005 |
| JP | 2008304471 A | 12/2008 |
| JP | 2009133786 A | 6/2009 |
| KR | 1020070039923 A | 4/2007 |
| TW | 565858 | 12/2003 |
| TW | 1241398 | 10/2005 |
| WO | 2010056769 A2 | 5/2010 |
| WO | WO2010056769 A2 | 5/2010 |

OTHER PUBLICATIONS

ASTM E-376-03 (2003).*
International Search Report and Written Opinion (with English translation), dated Dec. 29, 2011, which issued during the prosecution of International Patent Application No. PCT/FR2011/051232.
Japan Steel Industriel Standard H8501 (1999).

* cited by examiner

Primary Examiner — Dah-Wei D. Yuan
Assistant Examiner — Jose Hernandez-Diaz
(74) Attorney, Agent, or Firm — Davidson, Davidson & Kappel, LLC

(57) ABSTRACT

A method and device for measuring the thickness of a coating material layer of a running strip according to which, by means of an eddy current sensor for at least one area of the strip, a quantity is measured, representative of the thickness of the coating layer and the thickness of the coating layer is determined from the measured quantity and from at least one calibration value. The measurement made with an eddy current sensor comprises the measurement of the complex impedance of a coil facing the running strip for a low excitation frequency and a high excitation frequency and the elaboration of a quantity representative of the thickness of the coating layer from said complex impedance measurements. A device for applying the method and a coating installation equipped with the device.

22 Claims, 7 Drawing Sheets

METHOD AND DEVICE FOR MEASURING THE THICKNESS OF A COATING LAYER ON A RUNNING STRIP

CROSS-REFERENCE TO RELATED APPLICATION

The present application is a National Stage Application of PCT/FR2011/051232 ("the 232 PCT"), filed May 30, 2011 and published as WO/2011/151585 on Dec. 8, 2011. The '232 PCT claims priority to International Application No. PCT/FR2010/051046, filed May 31, 2010 and published as WO/2011/151530 on Dec. 8, 2011. Both applications are incorporated herein by reference.

BACKGROUND

The present invention relates to measuring the thickness of a coating material layer of a running strip such as a strip of galvanized steel.

In order to protect steel sheets against corrosion, they are coated with a material such as zinc and galvanized sheets are thereby obtained. In order to produce this zinc coating, the strips are run in an annealing oven and then through a bell in order to have them penetrate into a liquid zinc bath so that they emerge therefrom coated with a zinc layer which is liquid and which is dried by blowing a gas such as nitrogen. After drying, the strips are optionally subject to a heat treatment so as to cause a reaction between the zinc layer and the steel substrate, and the sheets are then cooled and finally they are introduced into a surface rolling installation such as a «skin-pass mill» before being wound. In order to obtain sheets which have a nice regular surface so that, after having been painted, they have an excellent surface aspect, it is required that the zinc or zinc alloy coating layer be as smooth as possible. Further, in order to be able to guarantee good protection against corrosion, it is required that the coating layer be of a sufficient thickness in any point of the strip. In order to obtain this result on industrial installations reliably, it is both necessary to be able to control the process and check the result and therefore measure the thickness of the zinc layer. In order to conduct this thickness measurement, methods with X fluorescence are generally used, which give the possibility of making an absolute measurement of the thickness of the zinc layer but which have the drawback of being relatively slow. Because of its slowness, this process does not give the possibility of producing a dense mapping of the surface of the strip and therefore does not give the possibility of carrying out strict quality control. For the same reason, it only allows detection of process operational irregularities, the changes in variations of which are small. Consequently, by measuring the thickness of the coating by X fluorescence, it is not possible to achieve sufficiently strict control of the coating line in order to obtain a guarantee on the quality of the products, which is required for meeting the needs of the market.

In order to allow regulation of the thickness of a conducting coating layer on a ferrous substrate, the use of a measurement with an eddy current sensor with a high frequency of 500 kHz was proposed. But this method is not sufficiently accurate and is not intended for producing a mapping of the coating thickness of a strip.

The object of the present invention is to find a remedy to this drawback by proposing a means allowing measurement of the thickness of the coating layer on a running strip, which is sufficiently fast and accurate in order to be able to produce a dense mapping of the thickness of the coating layers on the strip and for allowing tight control of the coating line so as to be able to regulate relatively fast operational irregularities of the process.

SUMMARY

For this purpose, the object of the invention is a method for measuring a thickness of a coating material layer of a running strip according to which, by means of an eddy current sensor, for at least one area of the strip, a representative quantity of the thickness of the coating layer is measured and the thickness of the coating layer is determined from the measured quantity and from at least one calibration value.

The measurement made by means of an eddy current sensor comprises the measurement of the complex impedance of a coil facing the running strip for a low excitation frequency and a high excitation frequency and the elaboration of a quantity representative of the thickness of the coating layer from these complex impedance measurements.

Preferably, the low excitation frequency is comprised between 40 kHz and 150 kHz and the high excitation frequency is comprised between 400 kHz and 1000 kHz.

In order to determine said at least one calibration value, a measurement of the thickness of the coating layer may be conducted in at least one point of the area in which a measurement was conducted with an eddy current sensor, this measurement being preferably made by means of an X fluorescence thickness gauge.

Preferably, the exact nature of the material making up the strip and the coating type are identified and these data and the calibration value(s) are recorded in a correspondence table which may be used subsequently for determining the calibration value(s) to be used.

The measurement made with an eddy current sensor may further comprise the measurement of the complex impedance, for a low excitation frequency and a high excitation frequency, of a coil facing a reference sample and the determination of the quantity representative of the thickness of the coating layer from differences between the complex impedances of the coil facing the strip and of the coil facing the reference sample.

Preferably, the strip is a metal strip.

Preferably, the metal strip is in steel and the coating is a metal coating for example consisting of zinc or zinc alloy.

Before conducting the measurements with eddy current sensors, the strip may be demagnetized.

In order to conduct these measurements by means of eddy current sensors, a plurality of eddy current sensors may be used, arranged along at least one line substantially parallel to the surface of the strip, extending transversely relatively to the running direction of the strip and the sensors may be excited sequentially in order to obtain a series of measurements distributed over the width of the strip so as to obtain a transverse thickness profile.

In order to conduct the thickness measurements by X fluorescence, an X fluorescence gauge is for example used which may move laterally, relatively to the strip along a line substantially parallel to the surface of the strip.

Preferably, a plurality of series of measurements is conducted, distributed over the width of the strip so as to obtain a plurality of series of measurements distributed over the width of the strip, these series of measurements being distributed over the length of the strip. A plurality of transverse profiles distributed along the length of the strip is thereby obtained.

Preferably, the sequential excitation of the probes is performed at a suitable speed so that the acquisition time of a series of measurements distributed over the width of the strip is shorter than the time interval between two successive timing signals.

Preferably, the lateral position of the strip relatively to the line of eddy current probes is detected and the position of each measurement area is determined relatively to the width of the strip by means of the lateral position of the strip relatively to the line of eddy current sensors and of the position of each sensor in the line of probes.

In order to determine the positions of the measurement areas relatively to the length of the strip, a strip beginning is for example detected, such as the weld between two successive strips, and then the displacement of the strip is continuously detected and for each measurement the strip length separating the measurement point and the beginning of the strip is determined.

Preferably, the positions of the measurement area relatively to the length and to the width of the strip are recorded in order to produce a mapping of the coating thickness on the strip.

This strip is running for example in a continuous coating installation such as a hot-dip galvanization installation and at least one portion of the mapping is displayed in real time in a cabin for controlling the coating installation with a display means and/or at least one portion of the mapping is transmitted in real time to an automatic control device of the coating installation so that the control device elaborates a regulation set value for the coating installation and/or the mapping is recorded in a computer means for quality control purposes.

The invention also relates to a device for continuous measurement of the thickness of a coating layer on a running strip, which comprises a plurality of eddy current sensors arranged in at least one line on a supporting beam, a device for controlling the eddy current sensors connected to at least one means for following the progression of the strip, an automatic control means notably connected to a means for detecting the lateral position of the strip relatively to the plurality of eddy current sensors and to an X fluorescence thickness gauge, and a computer means for controlling and managing the measurements, connected to the device for controlling the sensors and to the automatic control means.

Preferably, the measurement device according to the invention comprises two parallel lines of eddy current sensors, wherein the positions of the sensors of one line are shifted relatively to the positions of the sensors of the other line. With such a configuration it is in particular possible to increase the proportion of the surface area subject to measurements by eddy currents.

The eddy current sensors are with two frequencies, and preferably of the differential type.

Preferably, the supporting beam of each line of eddy current sensors is movably mounted between a service position and a retracted position and the device comprises a means for displacing the beam between the service position and the retracted position controlled by the automatic control means which is also connected to a means for detecting a geometrical defect of the strip, and the automatic control means and the means for displacing the beam are adapted so as to rapidly displace the eddy current sensors towards the retracted position in the case when a geometrical defect of the strip is detected.

Preferably, the device further comprises a plurality of balancing samples borne by a suitable device for placing them so that they face the eddy current sensors in the retracted position.

The device may further comprise a means for demagnetizing the strip, arranged upstream from the eddy current sensors relatively to the running direction of the strip.

The invention finally relates to an installation for continuously coating a running strip of the type comprising a coating device and a line for discharging and processing the strip after coating, comprising a device arranged in the line for discharging and processing the strip in order to apply the method according to the invention.

The installation is for example an installation for hot-dip coating a metal strip with a metal or metal alloy, such as a continuous hot-dip galvanization installation.

The installation may comprise at least one lateral guiding roll. In the service position, each line of eddy current sensors is arranged facing a generatrix of the guiding roll and the means for timing the measurement is connected to a pulse generator driven by the lateral guiding roll.

BRIEF DESCRIPTION OF THE DRAWINGS

The invention will now be described more accurately but not as a limitation, with reference to the appended figures wherein.

DETAILED DESCRIPTION

Figure 1:
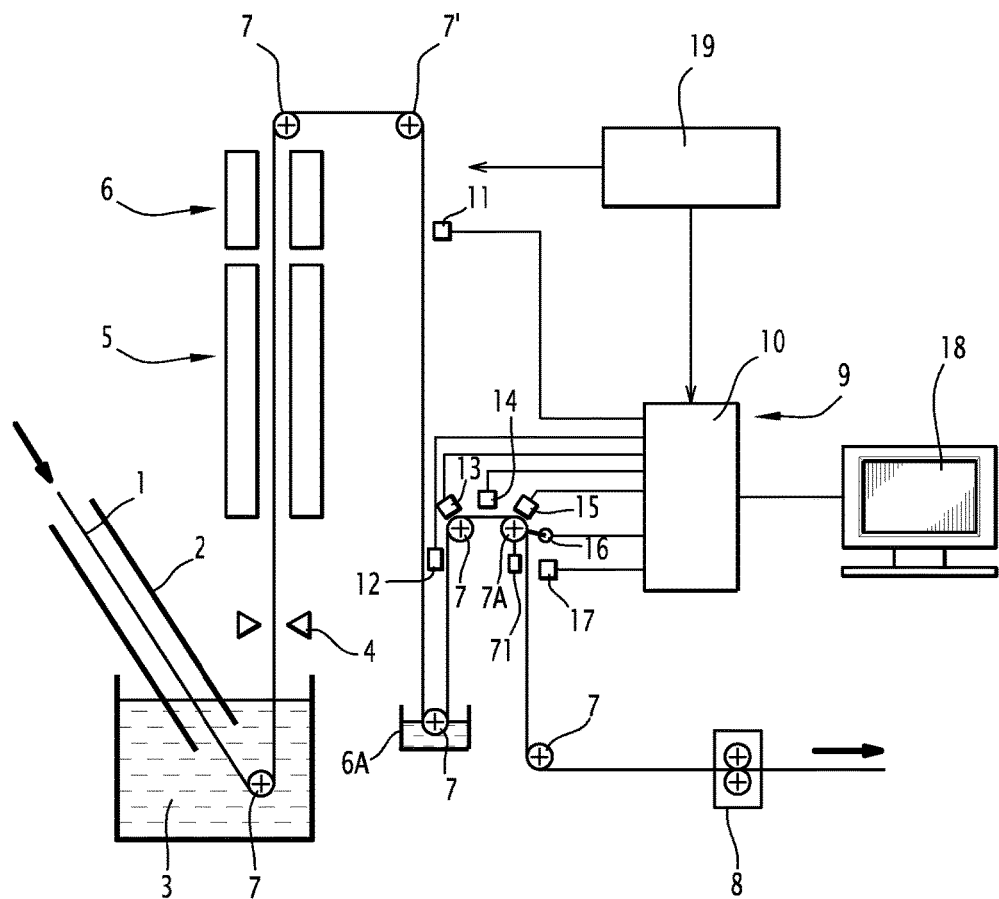
FIG. 1 schematically illustrates a hot-dip coating installation for a continuously running strip notably including means for measuring the thickness of the coating layer.

In FIG. 1, a continuous hot-dip galvanization for a strip 1 running in the direction of the arrow is schematically illustrated. This strip which stems from an oven in which it has been annealed and brought to a suitable temperature for galvanization and which is not illustrated, passes through a bell 2 which allows it to penetrate into a liquid zinc or zinc alloy bath 3. After having been deflected by at least one roll 7, the strip again leaves by moving upwards in order to exit the galvanization bath, passes between nozzles 4 for drying by gas blowing, and then moves upwards into a treatment and cooling tower. In this tower, the strip, after having optionally passed through an alloying oven 5, passes between cooling boxes by gas blowing 6, and then moves down while passing over a roll 7', (called a «top roll») towards a water quenching tank 6A and again moves upwards in a second loop comprising a device for centering the strip 71, before being removed through a surface rolling mill of the «skin pass» type 8 and then wound. The device for centering the strip 71 comprises a lateral guiding roll 7A. This hot-dip coating line, known per se to one skilled in the art, is equipped with a means generally marked as 9 for measuring or monitoring the thickness of the coating layer. This means 9 for monitoring the thickness of the coating layer comprises an automatic control means 10 connected to an X fluorescence thickness measurement device 11, to a device 12 for detecting the weld of two successive strips, to a device 13 for detecting a geometrical defect on the strip, to a device 14 for demagnetizing the strip, to a device 15 for measuring a quantity representative of the thickness of the coating layer by means of eddy current sensors. The eddy current sensors of the measuring device 15 are positioned facing the lateral guiding roll 7A which drives a pulse generator 16, itself connected to the automatic control means 10. Finally the automatic control means 10 is connected to a device 17 for detecting the lateral position of the strip. The automatic control device 10 is also connected to a means 18 for displaying the results, which is for example a screen, on the one hand and to a computer for managing the coating method 19 on the other hand.

The means 11 for measuring the thickness of the coating layer by X fluorescence is a means known per se which includes an X fluorescence measurement gauge movably mounted transversely relatively to the strip, substantially parallel to the surface of the latter. With this gauge it is possible to continuously conduct an accurate measurement of the thickness of the coating layer. However, as it is rather slow, it only allows measurement of thicknesses on ranges not ensuring dense coverage of the surface of the strip.

The device 12 for detecting junction welds of successive strips is a device known per se used on continuous coating installations and which allows detection of the change of strip. Indeed, on these continuous coating installations, the coating of successive strips connected together by welds is carried out. These strips, stemming from different reels, may be of different nature. By detecting the weld, it is possible to detect the passing of a strip change and to follow the time course of the passing of the strips in the installation.

The demagnetization device 14 is a device known per se which generates a 50 Hz alternating longitudinal magnetic field for example which, combined with the movement of the strip, demagnetizes the latter. This device is only necessary when the galvanization installation includes means for stabilizing the strip by a magnetic effect. Indeed, these devices for magnetic stabilization of the strip generate permanent magnetization of the latter which may perturb measurements made by methods with eddy currents. When the coating installation does not have any magnetic stabilization means, the thickness measurement installation does not include any demagnetization device.

The device 13 for detecting a geometrical defect of the strip is for example formed with one or two lasers which emit light rays parallel to the surface of the strip at a roll 7, such as the one following the exit of the strip from the water quenching tank, the laser ray(s) will illuminate photoelectric cells. When the strip which circulates in the installation is actually planar, the latter passes under the laser beams which normally illuminate the photoelectric cells. When the strip has a too large geometrical defect, the latter will intercept a light ray from a laser. When the ray is intercepted, it no longer illuminates the photoelectric cell, which gives the possibility of generating a signal for detection of a geometrical defect of the strip. Such a signal may be used for triggering the safeguarding of certain pieces of equipment.

The measurement device 15 using eddy current sensors, which will be described in more detail subsequently, consists of at least one beam on which is arranged a plurality of eddy current sensors aligned along at least one line parallel to the surface of the strip and extending laterally with respect to the strip. When operating, these sensors are arranged facing at least one generatrix of a lateral guiding roll for the strip 7A, which drives a pulse generator 16. This pulse generator 16 driven by the guiding roll 7A gives the possibility of following the progression of the strip in a way known per se to one skilled in the art.

Figure 2:
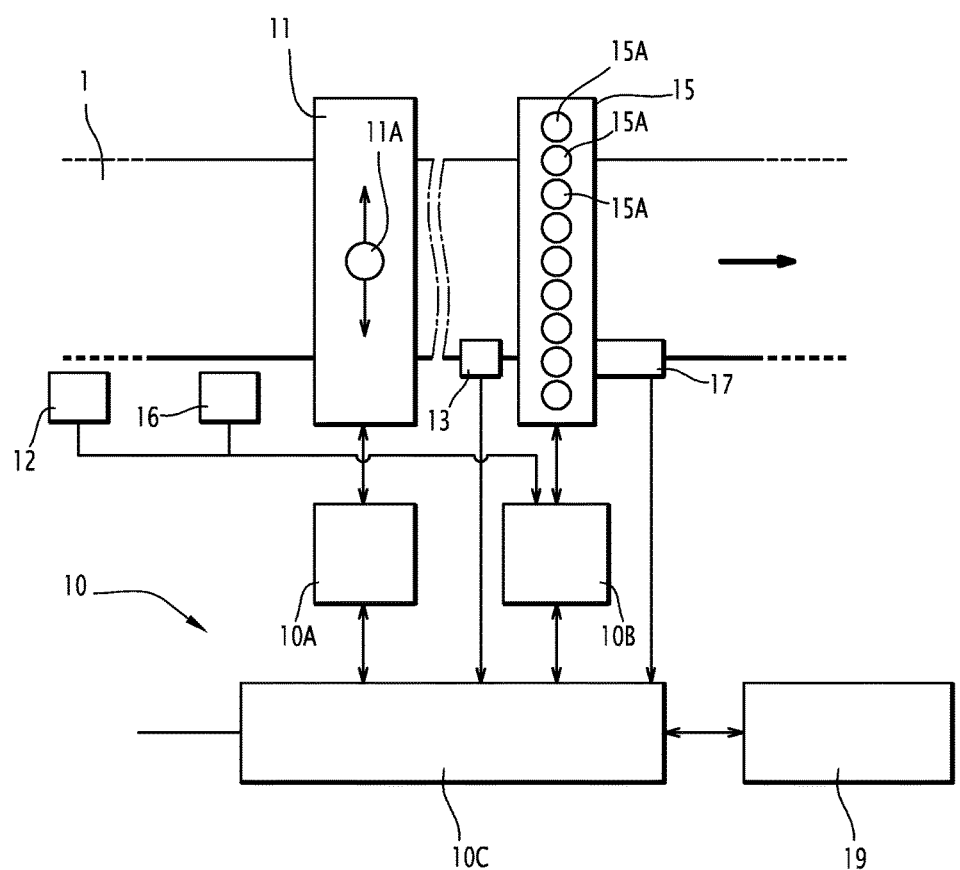
FIG. 2 illustrates a schematic top view of a means for measuring the thickness of the coating layer of a running strip comprising an X fluorescence measuring means on the one hand and a measuring means with an eddy current sensor.

In FIG. 2, the means for measuring the thickness formed by the X-ray gauge and by the eddy current measurement device are illustrated as a top view and schematically.

The X fluorescence gauge 11 includes a measurement head 11A driven transversely relatively to the running direction of the strip 1 by a mechanism known per se to one skilled in the art and consisting of a frame and of driving means. This measurement head is connected to a control means 10A of the X fluorescence gauge which receives information relating to the position of the measurement head 11A and to the result of the conducted measurements. This means for controlling the X fluorescence gauge 10A is connected to the control computer 10C of the device for measuring the thickness of the coating on the strip.

The measurement device using eddy current sensors 15 here consists of a beam on which are arranged along a transverse line relatively to the running direction of the strip, a plurality of eddy current sensors 15A of small size. These sensors are connected to a means 10B for controlling the eddy current sensors, which also receive information from the means 12 for detecting a weld and from the pulse generator 16 giving the possibility of following the progression of the strip and which may send information on the results of measurements to the control computer 10C of the device for measuring the thickness of the coating layer. This computer 10C for controlling the means for measuring the thickness of the coating layer is connected to means 17 for detecting the lateral position of the strip relatively to the measurement device. The computer 10C is connected to the computer 19 for conducting the method, of the coating installation. The whole of the means 10A, 10B and 10C form the automatic control means 10.

The number of eddy current sensors is adapted according to their diameter and to the width of the coating line so as to be able to measure the thickness of the coating layer over the whole width of the coated strips. As an example, for a line with a width of 1.50 m, the number of sensors may be 16, which allows measurement every 100 mm.

Figure 4:
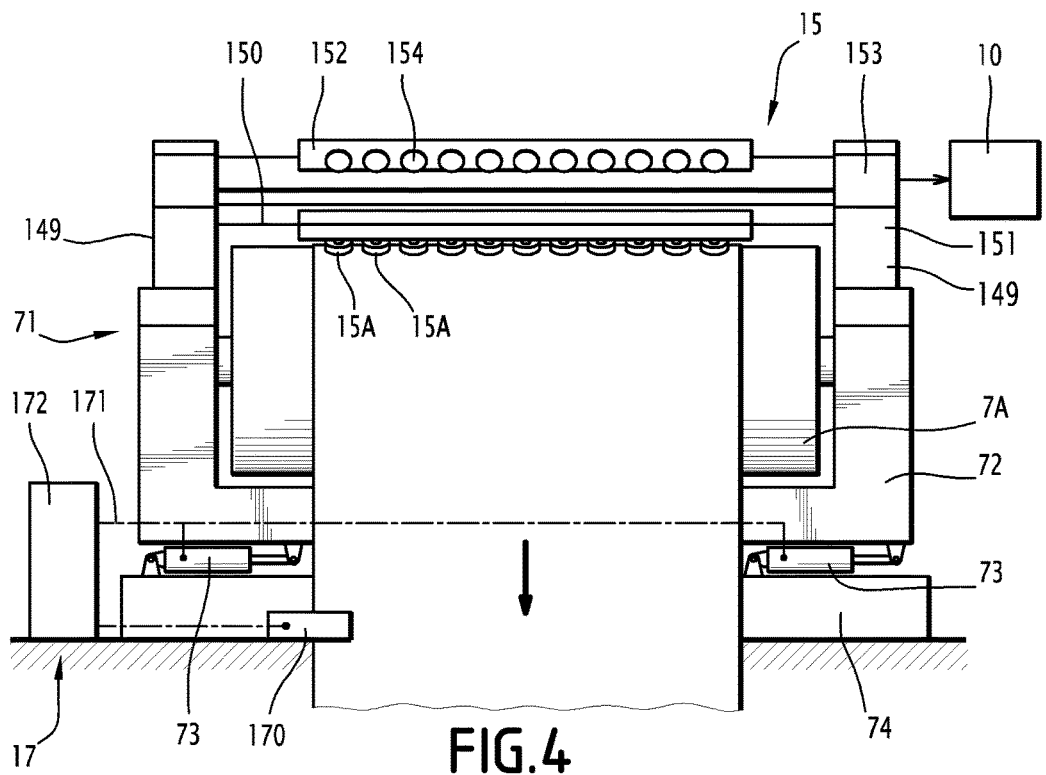
FIG. 4 is a front view of a guiding roll for a running strip, equipped with a means for measuring the thickness of a coating layer by means of eddy current sensors.
Figure 5:
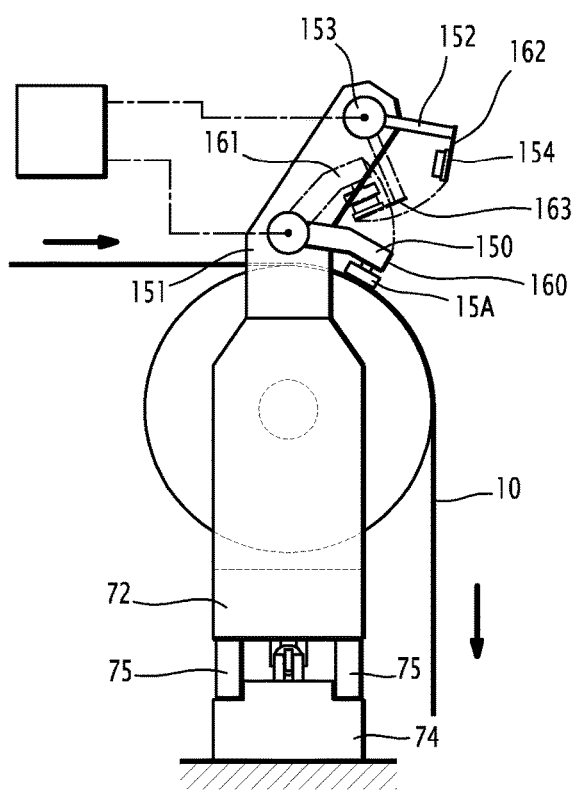
FIG. 5 is a profile view of the device of FIG. 4.

The device 15 for measuring thickness by means of eddy current probes, is illustrated in more detail in FIGS. 4 and 5. This device, which is arranged facing a generatrix of a roll 7A of a lateral guiding device 71, consists of a beam 150 on which are arranged the eddy current sensors 15A. This bean is driven into rotation by a motor 151 which is a hydraulic or pneumatic motor for example. Rotation of the beam allows displacement of the eddy current sensors between a service position 160 and a retracted position 161.

In the service position, the sensors are in the proximity of the surface of the running strip 1, this distance is of the order of about ten millimeters but may be comprised for example between 1 and 20 millimeters. In the retracted position, the sensors are lifted up and properly moved away from the strip which gives the possibility of either handling the strip without any difficulty or letting through the geometrical defects of the strip.

The measurement device using eddy current sensors 15 also includes a second beam 152 also driven into rotation by a hydraulic or pneumatic motor 153 for example. This beam 152 bears a plurality of «standard» washers 154, as numerous as the eddy current sensors borne by the beam 150, and arranged so as to be able to be placed facing the eddy current sensors when they are in a retracted position. The beams 150 and 152 as well as their driving motors are mounted via chassis 149 on the cradle 72, which supports the roll 7A of the device 71 for lateral guidance of the strip. This cradle 72 rests via slides 75 on a chassis 74, which rests on the ground. The cradle 72 is laterally driven by actuators 73 controlled by a means known per se for controlling the centering of the strip. Indeed, the lateral centering of the strip on the line is achieved by laterally displacing the roll 7A borne by its cradle 72. The position of the actuators 73 is recorded by measurement means known per se, such as for example inductive, wire sensors or other sensors which are connected to a control and measurement means 172. Detectors 170 of the position of the strip relatively to the ground, which are for example means of the eddy current type, giving the possibility of detecting the proper centering or the decentering of the strip, are also connected to the control and measurement means 172. As the beam 150 bearing the eddy current sensors 15A is mechanically connected to the cradle 72, which supports the roll 7A, the position of the cradle relatively to the ground being measured by means of the measurement device associated with the actuator 73, the centering of the strip being measured by means of the device 170 and the width of the strip being known, it is possible to determine the position of the strip relatively to the eddy current sensors 15A. Consequently, as the position of each eddy current sensor with which the measurements are made, is known, the exact position of each measurement is known relatively to the width of the strip.

Figure 6:
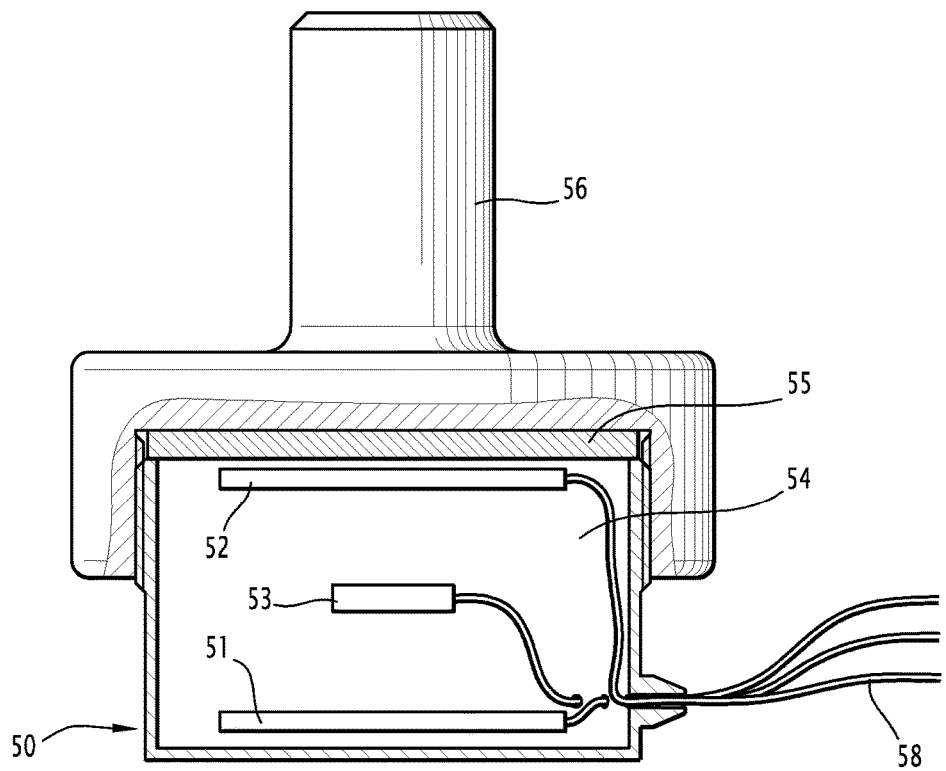
FIG. 6 is a sectional view of a differential eddy current sensor.

The eddy current sensors are two-frequency differential sensors which are illustrated, enlarged in a sectional view in FIG. 6.

They include a measurement head 50 which includes a first coil 51 intended to be placed facing the strip to be measured, a second coil 52 identical with the first and positioned opposite to the first coil, both of them being contained in a block 54 consisting of heat-conducting resin which also contains a temperature probe 53. The second coil 52 faces a reference sample 55 consisting of a steel disc including a layer coated with zinc. This assembly is held by a yoke 56 into which the measurement head is screwed.

This differential sensor has the advantage of not being very sensitive to changes in temperature because of the heat-conducting resin which allows equalization of the temperatures of both coils. As this probe is insensitive to temperature, it is not necessary to provide compensation means such as thermistors or to make windings in special alloys not very sensitive to heat but which have the drawback of having not always satisfactory electric properties.

Figure 7:
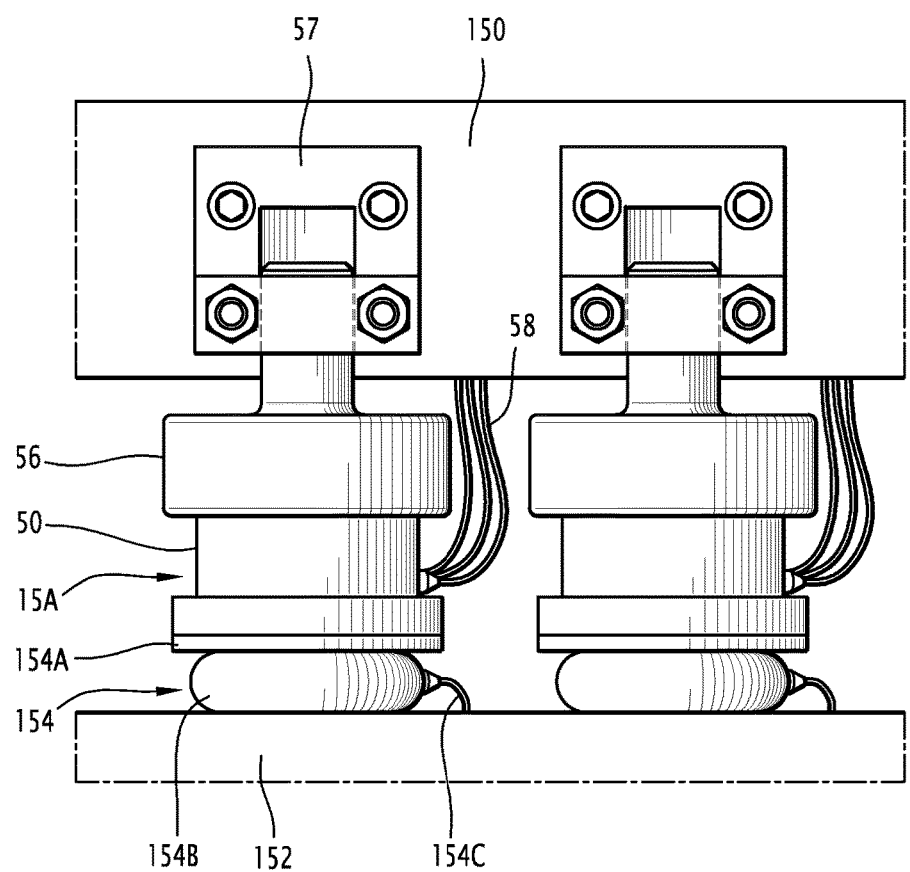
FIG. 7 is a schematic view of a device for measuring the thickness of a coating layer by means of eddy currents, comprising calibration means.

In FIG. 7, the front of a beam portion 150 has been illustrated, bearing eddy current sensors 15A put into contact with the calibration means 154 borne by the beam 152. Each eddy current sensor 15A includes as indicated earlier, a measurement head 50 borne by a yoke 56 maintained on the beam 150 by maintaining means 57 which one skilled in the art may design without any difficulties. These sensors 50 are connected through cables 58 to the control and sensor measurement box. The calibration means 154 borne by the beam 152 comprises a washer 154A cut out in a coated metal sheet of the type of the one intended to be measured. This washer 154A is identical with the sample of reference 55 positioned inside the eddy current sensors. The washer 154A is adhesively bonded on a shim in a plastic material, the thickness of which is equal to the distance between the surface of the strip and a sensor in the measurement position. The washer adhesively bonded on the shim forms a calibration sample which is born by a pneumatic actuator 154B which allows it to be flattened against the surface of the eddy current sensors. The calibration washers 154A allow the sensors to be adjusted. Indeed, when a calibration washer is against the sensor, the washers seen by both coils 51 and 52 of the sensor being identical, it is possible to adjust the settings of the device so that the signal delivered by the sensor corresponds to the identity of both washers.

In the illustrated embodiment, the measuring device only includes one line of eddy current sensors. But, in order to increase the density of the measurements, in the transverse direction, the device may comprise several lines of sensors parallel with each other, the sensors of one line being laterally shifted relatively to the sensors of another line so that the sensors of one line are arranged facing the interval between two sensors of the other line.

In the described embodiment, the measuring device is arranged after the quenching tank. But other arrangements are possible. In particular, the device may be arranged at the top of a treatment and cooling tower, facing the so-called «top roll» for example. This arrangement has the advantage of leading to detection of possible drifts of the method which are more rapid in the illustrated arrangement. But it has the drawback that the temperature of the strip is still quite high (150 to 200° C.), which requires more significant temperature compensations.

Figure 8:
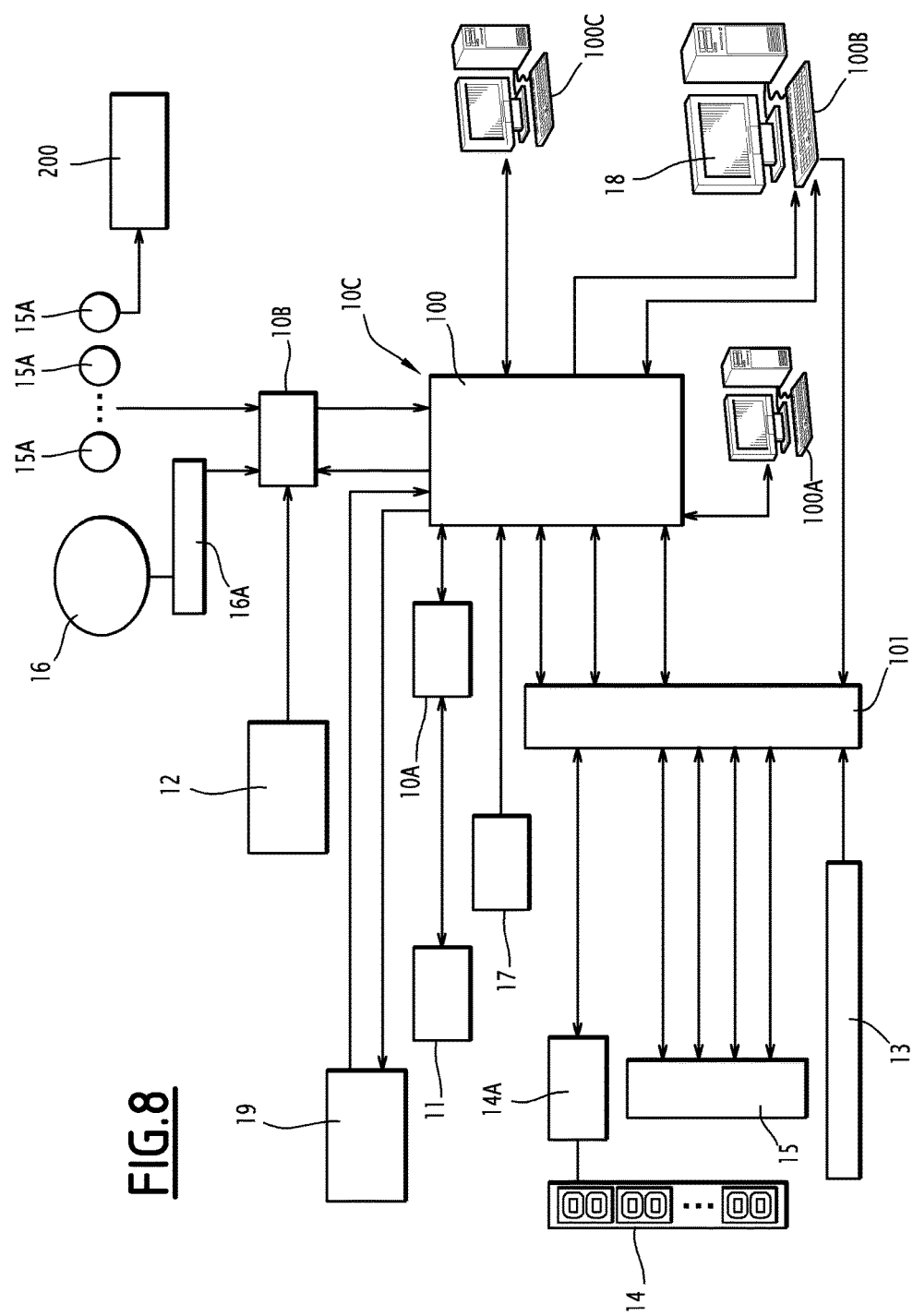
FIG. 8 is a schematic illustration of a device for monitoring/controlling a device for measuring the thickness of the coating layer on a running strip in a continuous coating installation.

In FIG. 8, the architecture of an automatic control of the installation for measuring the thickness is schematically illustrated, using eddy current sensors intended to be implanted on a continuous coating line. In this diagram, the eddy current sensors are marked as 15A and may send a temperature measurement signal to a temperature recorder 200. The eddy current sensors 15A are connected to a control box for measuring eddy currents 10B which includes all the electronics required for executing measurements by eddy currents, which are known per se. The box is also connected to the pulse generator 16 driven by the lateral guiding roll of the strip. The pulses of the pulse generator 16 are shaped by an electronic shaping means 16A known per se to one skilled in the art. The electronic control box for the eddy current sensors 10B is also connected to the detector 12 of the weld of the strip which allows detection of the beginning of a strip and thus locates the positions of the measurements made on the strip. The electronic control means 10B for the eddy current sensors are connected to a computer 100 which is itself connected to the computer 19 for controlling the process of the coating installation on the one hand in order to be able to receive information on the width, the length and the thickness of the strip on the one hand, the targeted coating thickness and the nature of the steel with which the strip is made up, and to be able to send to this computer the results of thickness measurements on the other hand in order to store it as a mapping of the thickness of the coating. The computer 100 for conducting the thickness measurement method is also connected to a automaton 101 itself connected to the mechanical device for measurement by eddy current sensors 15 so as to be able to control this installation, i.e. control the positioning of the sensors so as to be able to conduct measurements, trigger the fast setting of the sensors into a retracted position when a geometrical thickness defect of the strip is detected by the detection means 13 connected to the automaton 101, control the positioning of the balancing samples and notably the inflating of the hydraulic actuators so as to be able to carry out balancing of the sensors. The automaton 101 is also connected to the demagnetization means 14 via an electronic shaping box 14A.

Moreover, the computer 100 is connected to a plurality of terminals 100A, 100B and 100C which allow it to be controlled or to transmit information specific to the operation of the computer or to display measurement results. In particular the display means 18 which is part of the terminal 100B allows display of the mapping of the thickness measured on the strip. This terminal 100B is for example installed in the control cabin of the coating installation.

Generally, one skilled in the art knows how to design and implant architectures of devices for automatic control of installations of this type.

The principles of the measurement of the thickness of the coating layer of a coated strip by means of the device which has just been described, will now be described, and then its use on a hot-dip coating installation will be described.

As indicated earlier, X fluorescence measurements have the advantage of being accurate measurements of the thickness of the coating layer but have the drawback of being conducted relatively slowly. Indeed, the measurement is conducted by means of a measurement head which moves laterally relatively to the running direction of the strip so as to cover the whole width of the strip. Consequently, in order to obtain a complete coating thickness profile over the width of the strip, it is required that the measurement head have covered the whole width of the strip. Taking into account the running speeds of the strips in coating installations of this type which range from 30 m/minute to about 150 m/minute and taking into account the speed at which the X fluorescence measurement head may be moved, a complete profile of the width of the strip is generally obtained only about every 50 meters of strip. Of course, these profiles are measured along oblique lines relatively to the axis of the strip and form a small angle with this axis.

The means for measurement using eddy current sensors gives the possibility of obtaining quantities representative of the thickness of the coating layer which are only relative measurements, i.e. they need to be calibrated. On the other hand, the device has the advantage of allowing measurements to be conducted within very short times.

In order to carry out a measurement of thickness of a coating layer by means of an eddy current sensor, it is known how to conduct a measurement of complex impedance for an excitation frequency of about 500 kHz selected so that the skin thickness is slightly greater than the thickness of the coating layer. But with such a method, the measurement is very sensitive to thickness of the layer to be measured and to the variations in distance between the sensor and the layer to be measured, when this distance is small. It is less sensitive to the thickness of the layer to be measured and to the variations in distance between the sensor and the layer to be measured, when this distance is larger. Consequently, the measurement is always insufficiently accurate either because too sensitive to the variations in distance between the sensor and the layer to be measured, or because it is not sufficiently sensitive to the thickness variations of the layer to be measured.

In order to find a remedy to this drawback, the inventors newly ascertained that it was possible to do without the variation in distance between the sensor and the layer to be measured by using two measurements, one conducted at a high frequency such that the skin effect thickness is slightly greater than the thickness of the coating layer to be measured and substantially less than the thickness of the coated steel strip, and the other one made at a low frequency selected so that the skin effect thickness is close to the thickness of the coated steel strip. It is preferable that this skin effect thickness remain less than the thickness of the strip, so as not to interfere too much with the supporting rolls of the strip when the sensors are placed at right angles to one of these rolls. For skin steel strips with a thickness comprised between 0.4 and 1.5 mm, coated with zinc layers with a thickness comprised between 5 µm and 70 µm which corresponds to weights of zinc per m² also called a «load» of the zinc layer, comprised between 35 g/m² and 500 g/m², the high frequency is comprised between 400 kHz and 1,000 kHz and preferably comprised between 500 kHz and 900 kHz, and for example equal to about 750 kHz; the low frequency is comprised between 40 kHz and 150 kHz, preferably between 50 and 100 kHz and for example equal to about 60 kHz.

For each of the high and low frequencies, the imaginary parts $I_e$ and $I_b$ are respectively measured in a known way and the real parts $R_e$ and $R_b$ of the complex impedances of the sensor are respectively measured in the presence of the strip to be measured.

According to the invention, the modulus M of a compensated complex impedance is then measured from the impedances at high and low frequencies:

$$M=[(R_b-aR_e+bI_e)^2+(I_b-aI_e-bR_e)^2]^{1/2}$$

Next, the measured zinc thickness is calculated:

$$Ep_{zinc}=m_2 \times M^2 + m_1 \times M + m_o$$

The coefficients $m_2$, $m_1$ and $m_0$ are calibration coefficients depending on the nature of the coating and on that of the substrate (steel with which the strip is made up). They are determined by preliminary tests which one skilled in the art knows how to perform.

The coefficients a and b depend on the thickness of the coating layer $Ep_{zinc}$, according to the following formulae:

$$a=a_1 \times Epz + a_0$$

$$b=b_2 \times Epz^2 + b_1 \times Epz + b_0$$

The coefficients $a_0$, $a_1$, $b_0$, $b_1$, $b_2$ are calibration coefficients determined by means of preliminary tests which one skilled in the art knows how to perform.

The coefficients a and b depend on the zinc thickness, in order to calculate the exact zinc thickness, one proceeds with iteration. For this, a theoretical zinc thickness Epzth is set, for example corresponding to the expected thickness, and the corresponding coefficients a and b and then a first estimated zinc thickness Epze are calculated. By means of this estimation, the coefficients a and b are recalculated and a better estimation of the zinc thickness is obtained.

Although it is possible to perform additional iterations, the inventors noticed that a single iteration was sufficient for obtaining sufficient accuracy.

The method has just been described for the case of a measurement conducted with a simple eddy current sensor.

When a differential sensor is used, for each of the excitation frequencies, the complex impedance of the coil facing the strip and of the coil which faces the standard sample are measured. Next, the difference of the components of these two complex impedances is calculated which gives two quantities, one corresponding to the real component, the other one to the imaginary component. From both of these quantities, it is possible to calculate in a way known per se, a quantity representative of the thickness of the coating layer on the strip for which measurement of the thickness of the coating layer is intended. In order to determine the exact thickness of the coating layer, it is then necessary to use calibration values which may be a zero Eo on the one hand and a gain G on the other hand. In this case, if M is the quantity determined from the measurement provided by the sensors, the real thickness of the coating layer will be written as: E=Eo+G×M. It is also and preferably possible to adapt the method described above for utilizing a measurement made with a simple eddy current sensor. One skilled in the art will know how to make this adaptation.

In all cases, the calibration values may be determined by using measurements conducted with eddy current sensors and measurements made at the same location with X fluorescence measurement means or by any other means with which an absolute measurement of the thickness of the coating layer may be conducted. These calibration values which depend on different parameters notably on the nature of the steel with which the strip is made up, may be recorded in a correspondence table between the characteristics of the coated strip and the calibration values. Consequently, when the characteristics of the strip are known, it is possible to seek the suitable calibration value(s) and the real thickness of the coating layer may thus be determined from the measurement conducted with the eddy current sensors.

Measurements of complex impedances have the advantage of allowing generation of a useful signal which remains insensitive to variations in the distance between the sensor and the strip but which remains sensitive to the zinc thickness. Thus, with the method according to the invention, it is possible to estimate the thickness of the zinc layer to within ±2 g/m$^2$ and even to within ±1.8 g/m$^2$, by using sensors positioned at a distance from the strip of less than 15 mm or even 10 mm and for example of the order of 8 mm. These measurements may be conducted for coating layers ranging at least up to 400 g/m$^2$ for both faces. It may be carried out on substantially larger thickness layers.

The eddy current sensors have the advantage of allowing very rapid measurements to be made since the measurement of impedance is conducted by sending very short pulses so that, for each sensor, the time required for carrying out the measurement, at a low excitation frequency and at a high excitation frequency is less than a fraction of milliseconds.

In order to obtain measurements over the whole length of the strip, it is possible to proceed by sequentially sending measurement orders to each of the sensors so as to acquire measurements on all the sensors extending over the width of the strip. Taking into account the measurement times per sensor, by proceeding in this way, it is possible to scan the whole width of the strip within about 2.5 milliseconds. Consequently, it is possible to perform scans of the strip every 5 milliseconds for example for a strip running at a speed of 150 meters/minute, make measurements over the whole width every 12.5 millimeters of strip.

This sequential control of the eddy current sensors has the advantage of avoiding interferences between two adjacent sensors.

In order to carry out the measurements on the strips, a complete scan may be carried out from the series of sensors in a time such that the recurrence frequency for the 16 sensors is 250 Hz for example. In order to obtain series of measurements over the strip distributed at a constant distance along the length, measurements are sampled at a frequency depending on the speed of the strip. For example when the strip runs at 150 m/min, the sampling frequency is 200 Hz, and it is only 20 Hz when the strip runs at 15 m/min. In both cases, the distance between two measurement lines is 12.5 mm.

Figure 3:
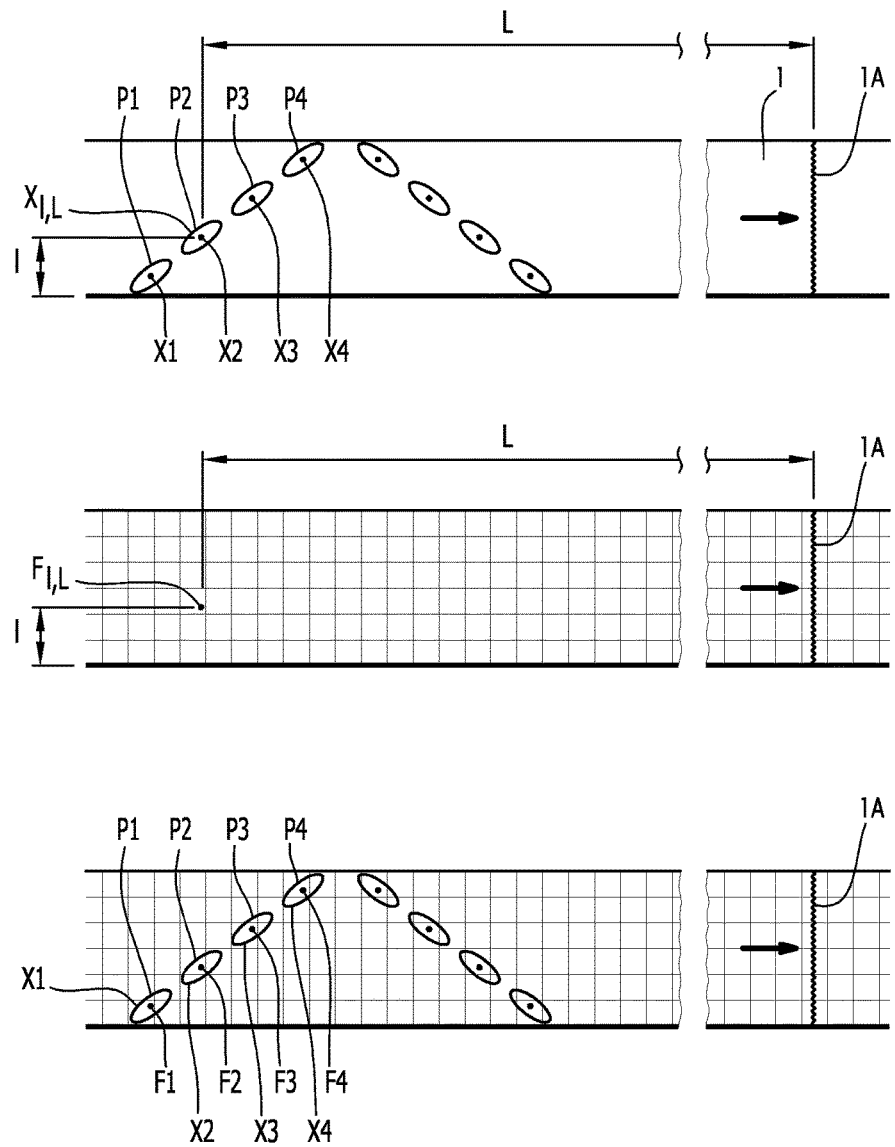
FIG. 3 is a schematic illustration of the principle for measuring the thickness of the coating layer of a running strip allowing reconstruction of a dense mapping of the coating thickness distribution.

Taking into account these differences in rapidity of the measurements made with eddy currents, and of the measurements made with X fluorescence for measuring the thickness of the coated layer on the strip, it is proceeded as indicated in FIG. 3 schematically. For this, by means of the X fluorescence probe and for a plurality of marked points P1, P2, P3, P4, distributed over the width and the length of the strip, thickness measurements X1, X2, X3 and X4 are carried out, the positions of which are recorded along the length of the strip relatively to the weld 1A, and the lateral positions relatively to the width of the strip. In order to determine these positions, the weld detector 12 is used and the pulse generator 16 driven by the strip guiding roll and the detectors of the position of the strip and of the measurement head relatively to the ground are used.

One skilled in the art knows how to use these different signals from each of the measurement points.

Simultaneously, by means of the device with eddy current sensors, measurements are conducted in a plurality of points $F_{L,L}$ positioned over the whole surface of the strip and the coordinates L of which are recorded relatively to the weld 1A and the coordinates L relatively to the edge of the strip are recorded, with which it is possible to obtain a mapping of a quantity representative of the thickness of the zinc coating layer.

The thicknesses X1, X2, X3, X4, measured by means of the X fluorescence probe and the quantities F1, F2, F3, F4 measured by means of the eddy current sensors for the corresponding points P1, P2, P3, P4, as indicated in FIG. 3 are then compared. In this figure, four measurement points distributed over the width are illustrated. This is only a schematic illustration there, and one skilled in the art will understand that there may be many more or less depending on the needs. From these measurements, calibration values are determined, which are then used in order to be able to transform the measurements of representative quantities of the thickness, conducted by the eddy current probes into real thickness values of the coating layer. Dense mapping of the measurement of the thickness of the coating layer is thereby obtained. The methods for determining the calibration values from the measurements are known to one skilled in the art. It will be noted that in certain cases, a single calibration, the zero Eo, may be sufficient.

This dense mapping of the thickness of the coating layer may be stored and used for proceeding with fine quality control and it may also be used for detecting abnormalities in the coating process. Because of the density of the measurements conducted with eddy currents, it is possible to detect abnormalities which develop rapidly since, when these measurements by eddy currents are conducted every five thousandth of a second, this corresponds to a sampling frequency of 200 Hz, which allows detection of rapid phenomena for a continuous coating line. This information may either be displayed in the control cabin of the coating installation or be sent back to a computer for conducting the process, which will utilize them for controlling the coating installation. It should be noted that the use of these measurements for detecting in real-time abnormalities in the coating process, which gives the possibility of finding a remedy to them, is all the more efficient since the measurement is conducted as close as possible to the coating tank.

As indicated earlier, the calibration values may also be sought in a correspondence table. By proceeding in this way, this has the advantage of allowing, by comparing the measurements which are made by X fluorescence probes and the measurements which are made with eddy current sensors for which calibration values are known, the proper operation of the X fluorescence probes to be monitored. Indeed, it is frequent that such probes have operating problems and by matching up the measurements made with X fluorescence probes and the measurements made with eddy current sensors, it is possible to detect such abnormalities more rapidly.

The correspondence table may be made up or enriched by using measurements conducted on reels of strips of different characteristics, notably steel grade, thickness of the strip, load of the coating.

For each of these strips, the complete mapping by eddy currents is recorded as well as a plurality of X fluorescence measurements allowing the establishment of a plurality of successive transverse profiles, the position of which is determined along the length of the strip. As an example, it is thus possible to record between 10 and 30 transverse profiles.

From these profiles, a so-called stable area of several successive profiles is selected, in which the sum of the deviations between the corresponding points of two successive profiles is less than a threshold set beforehand. This area, for example contains 6 or 8 successive profiles. Of course, one skilled in the art may adjust the number of recorded transverse profiles and the number of transverse profiles of the «stable» area depending on particular circumstances.

From transverse profiles measured by X fluorescence in the «stable» area, the «X fluorescence» transverse profile is determined in this area.

From measurements with eddy currents, an average «eddy current» profile is determined in the «stable» area defined for the average «X fluorescence» profile.

Next, by for example using a least squares method, the coefficients E and G of the calibration line are determined and they are recorded in the correspondence table by associating them with an identification parameter of the type of strip to which it applied (notably steel grade, optionally strip thickness).

This determination of the calibration coefficient is accomplished off-line. Also, it may be carried out by using measurements made on several strips consisting of the same steel but having coatings of different load (or thickness).

Upon producing the mapping of a particular strip, it is also possible to perform a so-called «real time» calibration. For this, as the measurements by eddy currents are gradually recorded, the thicknesses (or loads) of the coating are calculated by using the suitable calibration coefficients recorded in the correspondence table.

The «X fluorescence» profiles are also recorded as earlier. Valid successive profiles are sought, i.e. corresponding to the sums of deviations between two successive profiles below a threshold. As soon as such profiles are detected, the average «X fluorescence» load is calculated and is compared with the corresponding average «eddy current» load calculated from values obtained as indicated above.

Next, both average loads are compared and the coefficient Eo («zero») is adjusted so that the average «eddy current» load is equal to the average «X fluorescence» load.

This «real time» calibration may be carried out on all the monitored strips.

The method for measuring a thickness of a coating layer on a running strip has been described for the measurement of a thickness of a coating layer with zinc or with zinc alloy on a steel sheet. It is particularly suitable for measuring coating layers on strips running in coating installations at speeds preferably comprised between 5 m/min and 200 m/min. But this method and device for its application may be used for other types of coating and for example for aluminum alloy coatings on steel sheets, or tin coatings on steel sheets or more generally on coated strips, the coating layer and the substrate of which may react facing eddy current sensors. One skilled in the art will be able to determine what are the possible fields of application for such types of installations.

Finally, in the description which has just been made, the coating line only includes a measurement device with which the thickness of the coating layer may be measured on a single face of the strip. But it is possible without any difficulties to implant two measurement devices: one for each face of the strip.

Finally, the implantation of the device was described on a coating line, but any other implantation may be contemplated.

The invention claimed is:

1. A method for measuring a thickness of a metal coating layer of a coated running metal strip using a sensor with eddy currents, for at least one area of the metal strip, comprising the steps of:

measuring a quantity representative of the thickness of the metal coating layer on the coated running metal strip; and determining the thickness of the metal coating layer for the area from the quantity measured and from at least one calibration value, wherein the measuring step is conducted with an eddy current sensor and comprises the steps of:

measuring a complex impedance of a coil facing the running metal strip for a first excitation frequency and a second excitation frequency, the first excitation frequency comprising between 40 kHz and 150 kHz and the second excitation frequency comprising between 400 kHz and 1000 kHz; and elaborating a quantity representative of the thickness of the metal coating layer from said complex impedance measurements, wherein the step of elaborating a quantity representative of the thickness of the coating layer includes calculating a modulus M of a compensated complex impedance from the complex impedances measured at the first excitation frequency and at the second excitation frequency; and the step of determining the thickness of the coating layer includes calculating the thickness as a function of the modulus M.

2. The method according to claim 1, wherein at least one calibration value is determined by a step of carrying out a measurement of the thickness of said coating layer in at least one point of said area of the metal strip in which a measurement with an eddy current sensor is carried out.

3. The method according to claim 2, wherein said step of carrying out a measurement in order to determine said calibration value is conducted with an X fluorescence thickness gauge.

4. The method according to claim 1, wherein the measuring step made with the eddy current sensor further comprises measuring the complex impedance, for the first excitation frequency and the second excitation frequency, of a coil facing a reference sample and in that the quantity representative of the thickness of the coating layer is determined from differences between the complex impedances of the coil facing the metal strip and of the coil facing the reference sample.

5. The method according to claim 1, wherein the metal strip is in steel and the metal coating comprises zinc or zinc alloy.

6. The method according to claim 1, further comprising the step of demagnetizing the metal strip before carrying out measurements with eddy current sensors.

7. The method according to claim 1, further comprising the steps of:
arranging a plurality of eddy current sensors along at least one line substantially parallel to the surface of the metal strip, extending transversely relatively to the running direction of the metal strip; and
sequentially exciting the sensors so as to obtain a series of measurements distributed over the width of the metal strip.

8. The method according to claim 7, further comprising the step of distributing a plurality of said series of measurements over the width of the metal strip by timing the triggering of each of said series of measurements from a longitudinal displacement signal of the metal strip.

9. The method according to claim 8, wherein the longitudinal displacement signal of the metal strip is a signal generated by a pulse generator driven by a roll in contact with the metal strip.

10. The method according to claim 7, further comprising the steps of:
detecting the lateral position of the metal strip relatively to said at least one line of eddy current sensors, and
determining the position of each measurement area relative to the thickness of the metal strip by the lateral position of the metal strip relative to said at least one line of eddy current sensors and of the position of each sensor in the line of probes.

11. The method according to claim 10, wherein a metal strip beginning is detected and then the displacement of the metal strip is continuously detected and for each measurement the length of metal strip separating the measurement point and the metal strip beginning is determined, in order to determine the position of the measurement areas relatively to the length of the metal strip.

12. The method according to claim 11, further comprising the step of recording the position of the measurement areas relative to the length and to the width of the metal strip, elaborating a mapping of the coating thickness over the metal strip.

13. The method according to claim 12, wherein the metal strip runs in a continuous coating installation, and further comprising at least one of the steps of:
displaying at least one portion of the mapping in real time in a control cabin of the coating installation with a viewing means; or
transmitting at least one portion of the mapping real time to an automatic control device of the coating installation so that the control device elaborates a set regulation value for the coating installation; or
recording the mapping in a computer for quality control purposes.

14. The method according to claim 13, wherein the continuous coating installation is a hot-dip galvanization installation.

15. The method according to claim 11, wherein said metal strip beginning is a weld between two successive strips.

16. The method according to claim 1, wherein for each of the first and second frequencies, imaginary parts $I_e$ and $I_b$ and real parts $R_e$ and $R_b$ of the measured complex impedances are obtained, and the modulus M is calculated as follows:

$$M = \lfloor (R_b - aR_e + bI_e)^2 + (I_b - aI_e - bR_e)^2 \rfloor^{1/2}$$

wherein a and b are coefficients obtained iteratively using:
$a = a_1 \times Epz + a_0$,
$b = b_2 \times Epz^2 + b_1 \times Epz + b_0$, and
$Ep_{zinc} = m_2 \times M^2 + m_1 \times M + m_o$, and
wherein $Ep_{zinc}$ is said thickness, and $m_2$, $m_1$ and $m_0$ are calibration coefficients determined by preliminary tests.

17. The method according to claim 1, wherein the eddy current sensor is a differential sensor.

18. The method according to claim 1, wherein for each of the first and second frequencies, imaginary parts $I_e$ and $I_b$ and real parts $R_e$ and $R_b$ of the measured complex impedances are obtained, and the modulus M is calculated as follows:

$$M = \lfloor (R_b - aR_e + bI_e)^2 + (I_b - aI_e - bR_e)^2 \rfloor^{1/2}$$

wherein a and b are coefficients obtained iteratively using:
$a = a_1 \times Epz + a_0$,
$b = b_2 \times Epz^2 + b_1 \times Epz + b_0$, and
$E = Eo + G \times M$, and
wherein E0, G, $m_2$, $m_1$ and $m_0$ are calibration coefficients determined by preliminary tests.

19. The method according to claim 1, wherein the step of measuring is performed continuously on the running metal strip.

20. The method according to claim 1, wherein the step of measuring is performed every five thousandth of a second.

21. The method according to claim 1, wherein the method is repeated in a plurality of areas across a width of the running metal strip.

22. The method according to claim 1, wherein the method is repeated in a plurality of areas along a length of the running metal strip.

* * * * *